Figures 6, 7:
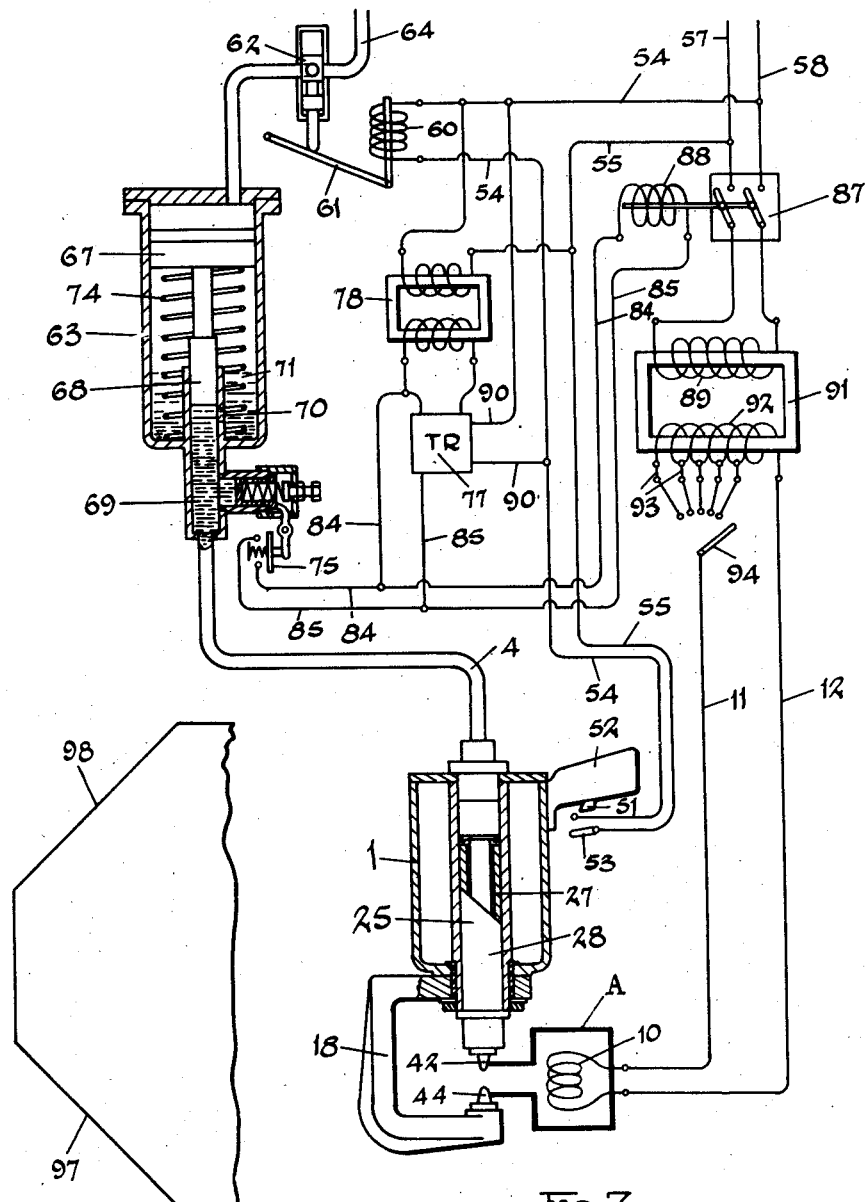

Jan. 13, 1942.  W. H. MARTIN  2,269,726
WELDER
Filed Feb. 8, 1939  3 Sheets-Sheet 1
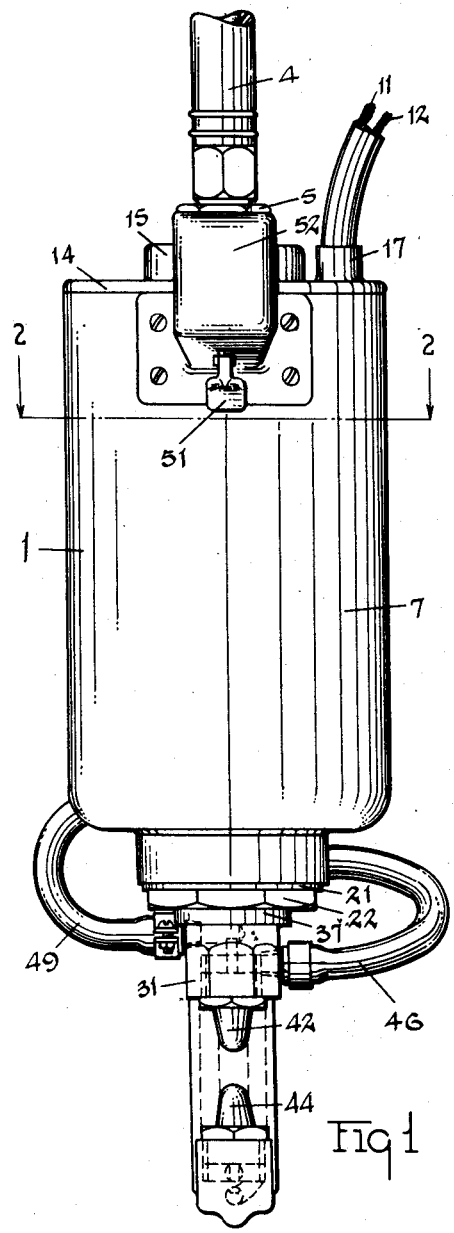
Fig 1
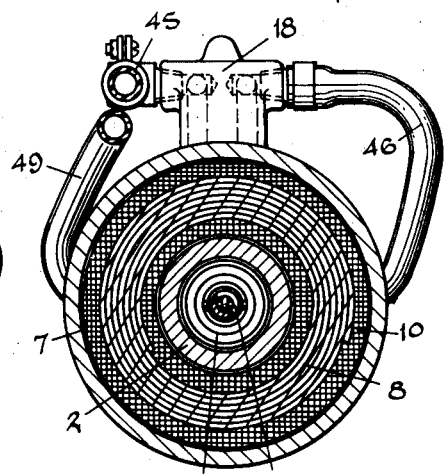
Fig 3
Fig 2
Inventor
William H. Martin
By
Attorney

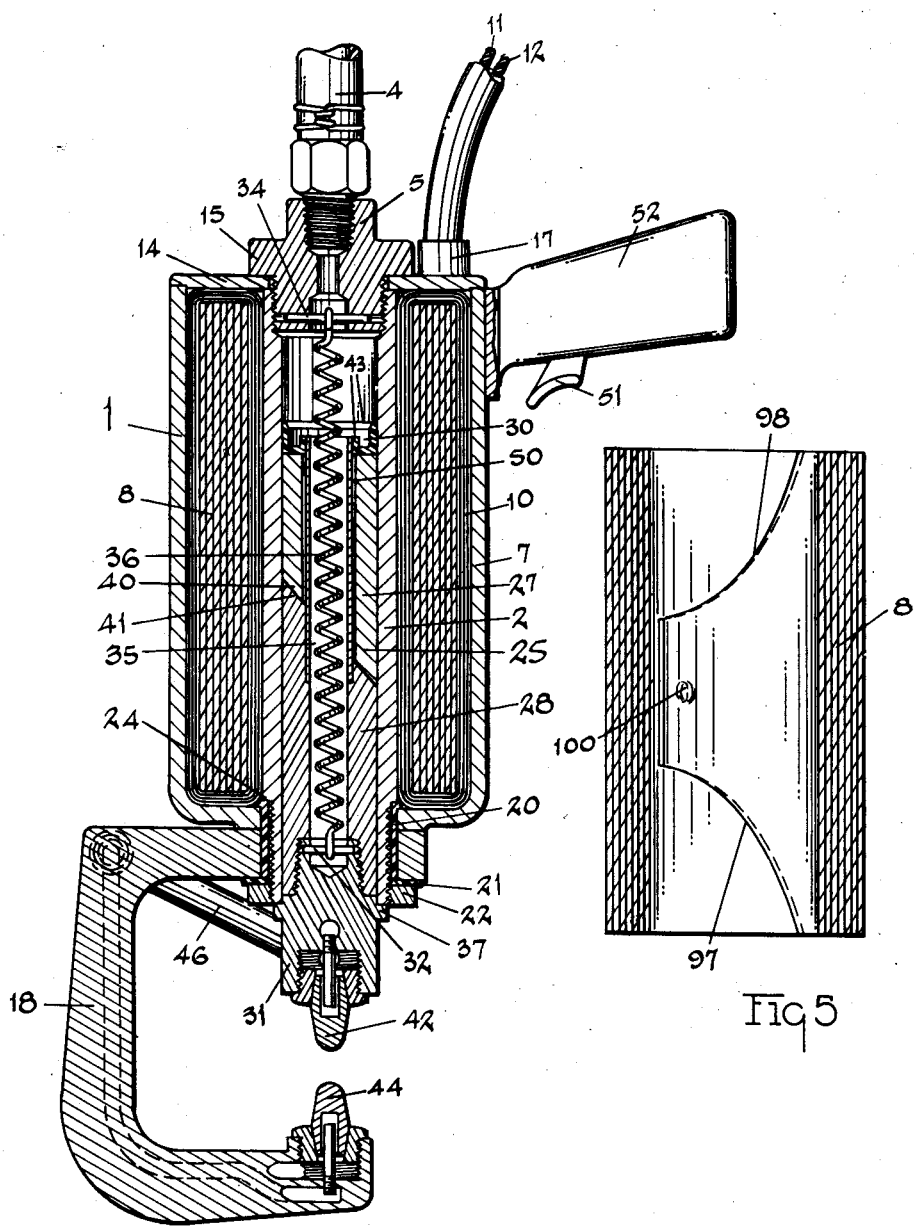

Patented Jan. 13, 1942

2,269,726

UNITED STATES PATENT OFFICE 2,269,726

WELDER

William H. Martin, Pleasant Ridge, Mich.

Application February 8, 1939, Serial No. 255,245

7 Claims. (Cl. 219—4)

My invention has for its object to provide an efficient welder wherein the pressure of the welding electrode on the work operates to produce an efficient contact pressure between the electrode-actuating elements through which the welding current flows to the electrode and the work.

The invention, also, provides an efficient light-weight welder electrically connected through flexible conductors carrying a small current that is transformed, within the welder, to a large current by a primary coil wound on a rolled core, and a secondary comprising the electrode-actuating cylinder and piston through which a large welding current is caused to flow, by the primary, to the electrode and the work.

The invention, also, has for its object to provide a two-part electrode-actuating member to move the welder electrode and to laterally and oppositely press the parts when the electrode engages the work and produces electrical contact pressure against a conductor part to cause the flow of the welding current to the electrode.

The invention consists in other features which will appear from the following description and upon examination of the drawings forming a part hereof. Structures containing the invention may partake of different forms and may be varied in their details and still embody the invention. To illustrate a practical application of the invention, I have selected a welder as an example of the various structures containing the invention and shall describe the selected structure hereinafter, it being understood that certain features of my invention may be used to advantage without a corresponding use of other features of the invention and without departing from the spirit of the invention as presented in the claims. The particular structure selected, is shown in the accompanying drawings.

Fig. 1 of the drawings illustrates a side view of the welder. Fig. 2 illustrates a view of a section taken on the plane of the line 2—2 indicated in Fig. 1. Fig. 3 illustrates a side view of a rolled transformer core. Fig. 4 illustrates a longitudinal central section of the welder. Fig. 5 illustrates a longitudinal section of the rolled core. Fig. 6 illustrates a view of an end part of the sheet metal of which the rolled core is formed. Fig. 7 illustrates, diagrammatically, the pressure and electric systems to which the welder is connected.

The welder 1 has a conductor cylinder 2 to which the parts of the welder are connected. The cylinder 2 is connected to a source of supply of fluid under pressure by means of a pipe 4. The pipe 4 is connected to the cylinder by the connector 5, which is threaded into one end of the cylinder 2. A shell 7 is located on the cylinder 2, and a rolled core 8, on which a primary 10 is wound, is located in the annular space formed in the shell between the cylinder 2 and the shell 7. The primary 10 is connected to a source of supply of electric current through the conductors 11 and 12. The upper end of the shell 7 is closed by a cover plate 14 located intermediate a flange 15, formed on the connector 5, and the end of the cylinder 2. The conductors 11 and 12 extend through a suitable boss or connector 17 located on the cover plate 14. An electrode bracket 18 is located in electrical contact with the shell 7 and is mounted on the lower end of the cylinder 2. The bracket is insulated from the cylinder by a suitable insulating collar 20 and washer 21. The collar 20 extends into the lower end of the shell 7 to insulate the lower end of the shell from the lower end of the cylinder. The end of the cylinder 2 extends through the shell 7 and the bracket 18, and the shell 7 and the bracket 18 are secured together by means of the nut 22 that clamps edges of the opening of the bracket and the lower end of the shell and the flanged part of the insulating collar 20 against a shoulder 24, and the flange 15 of the connector 5 clamps the cover plate 14 against the upper end of the cylinder 2. The parts may be readily assembled by locating the primary and wound core within the shell 7, slipping the shell 7 along the cylinder, placing the bracket 18 on the insulating sleeve on the end of the cylinder and then clamping the parts together by means of the nut 22 and filling the shell with electric insulating and heat conductive material. The cylinder is then closed by the cover plate 14 and secured by the connector 5.

A two-part piston 25 is located within the cylinder 2. The parts 27 and 28 of the piston have a free sliding fit in the cylinder 2 to reciprocably move in response to the pressure transmitted to the cylinder through the pipe 4. The part 27 is provided with a cup washer 30, and an electrode connector or socket 31 is connected to the other part 28 of the piston. The electrode socket 31 is threaded and the part 28 of the piston has a tapped, preferably tapered, opening for receiving the electrode socket 31.

The end of the electrode socket 31 has a transversely extending, small bore and a cross pin 32 is located therein. Also, a cross-pin 34 may be disposed in a transversely extending bore in the end of the connector 5. The parts 27 and 28 of the piston may be provided with a central, axially-extending bore 35, and a spring 36 may be located in the bore of the piston 25 and connected to the cross-pins 32 and 34 to normally subject the spring to a desired tension. One end of the bore is closed by the socket 31 and, consequently, the pressure that is transmitted through the pipe 4 to the cylinder 2 acts, not only on one end of the part 27 of the piston 25, but, also, on the part 28 to simultaneously move the parts of the piston. The spring 36 operates to return the parts when the pressure in the cylinder is reduced to a desired point. The extended inward movement of the piston 25, by the operation of the spring 36, is limited by engagement of a flange 37 formed on the electrode socket 31 which engages the end of the cylinder 2. Thus, the part 27 has relatively free, sliding movement within the cylinder in one direction, while the movement of the part 28 is yieldingly resisted by the spring 36 in an opposite direction.

Contacting surfaces 40 and 41 of the piston parts 27 and 28, respectively, are located in planes inclined to the axis of the piston and, when the pressure is transmitted through the fluid to the cylinder, the cylinder pressure being exerted on both of the piston parts 27 and 28, the piston parts move together in response to the pressure cylinder. When, however, a counter pressure is exerted against the outer end of the piston to resist or reduce the movement produced by the fluid pressure, the surfaces 40 and 41 operate to laterally press the piston parts against the wall of the cylinder 2. Where the pressure rises to a welding pressure, the surfaces 40 and 41 coact to produce electrical contact pressure against the cylinder wall and conduct a large welding current that may be induced by the primary 10 through the parts of the welder structure, such as the shell 7, the cylinder 2, and the piston 25, which constitute the secondary.

The circuit of the secondary is completed through the electrodes 42 and 44. The electrode 42 is mounted in the electrode connector socket 31 and the electrode 44 is mounted on the end of the electrode bracket 18 and so as to dispose the electrodes 42 and 44 in axial alignment to each other to engage work that may be disposed between the electrodes. The electrodes 42 and 44 may, also, be located in axial alignment with the piston and cylinder. The electrodes 42 and 44 may be of the usual construction and provided with water-cooled passageways for maintaining the electrodes cool, notwithstanding the high heat that is produced at their terminals when they engage the work during the welding operation. The flow of the cooling liquid may be conducted through a suitable pipe 45 to the bracket 18 which is provided with a passageway that leads to the interior of the electrode 44 and flows from the electrode 44 through a passageway to a pipe 46 that is connected to the electrode socket 31 through which it passes to the interior of the electrode 42 and returns through a passageway that is connected to a pipe 49 which directs the cooling liquid to the source of supply of liquid or to a point of discharge.

When the electrodes are pressed against the work with the required welding pressure, the piston parts are wedged laterally against the wall of the cylinder 2 by the high pressure of the surface 40 of the part 27 of the piston that contacts the surface 41 and, thereby, produces a large surface area of electrical contact between the surfaces 40 and 41 or the parts of the piston and the surfaces of the piston and the cylinder to electrically connect the electrode 42 with the cylinder to produce free flow of welding current that is induced by the primary 10 in the cylinder and piston. Although the parts 27 and 28 have a sliding fit, very slight clearance is taken up by a slight lateral movement of the parts within the cylinder when a welding pressure is transmitted to the cylinder 2. In order to prevent the fluid, such as oil, through which the pressure is transmitted, from entering between the surfaces 40 and 41, a tubular member 50 extends through the piston part 27 and is fitted into the part 28. There is a slight clearance between the tubular member 50 and the part 27 to permit the relatively lateral displacement of the parts. The cup washer 30 is elastic and annular in form and is provided with inner and outer flanges 43, one of the flanges slidably contacting along the inner cylindrical surface and the other of the flanges fits the upper end of the tubular member 50. When the pressure is introduced into the cylinder, the flanges are pressed, one against the surface of the cylinder, and the other against the outer surface of the tube to seal one end of the tube. Thus, the oil, if oil is used, does not penetrate between the surfaces 40 and 41 and a large conductive contact is maintained between the metallic parts of the piston when subjected to the axial and lateral pressure produced by the fluid pressure.

The welder may be controlled by the operator or may be operated automatically, as when the parts are installed in a machine, or the operation of the welder may be initiated by the operator and controlled automatically. In the form of construction shown, the welder is manually manipulated, in that it is manually placed in position with reference to the work. Its operation is manually initiated by means of closing a suitable switch which may be operated by a trigger 51 located in a handle 52 that may be secured to one end of the shell 7. The switch 53 that is operated by the trigger 51 may be located in a circuit for controlling the transmission of pressure to the welder cylinder and the welding current may be caused to flow and cease flowing during the period when the pressure is above a pre-determined pressure by a pressure-operated switch. If desired, a suitable timing device may be used for terminating the flow of the welding current in advance of the cessation of the welding pressure, which may be initiated by the operator's switch or the pressure switch.

In the form of fluid pressure and electric control system shown in Fig. 7, the trigger switch 53 is connected by means of the lines 54 and 55 to a source of supply of electric current which may be indicated by the lines 57 and 58. A solenoid 60 is located in the circuit of the switch 53. The solenoid operates a lever 61 which actuates a valve 62 to connect a booster 63 with a source of supply of fluid under pressure through a pipe 64. The booster 63 is provided with pistons 67 and 68, and, when the solenoid 60 is energized to open the valve 62, the pressure on the piston 67 causes the operation of the piston 68, which is located in a cylinder 69, to first close an opening 70 that connects the cylinder 69 with an oil reservoir 71 located in the lower end of the booster shell. This operates to maintain the communicating spaces between the pistons 68 and 25 full of oil. The piston 67 operates to depress the spring 74 and close the opening 70 and transmit the pressure, which is exerted by the air on the piston 67, to the piston 25 and through the piston 25 and the electrode 42 to the work, which is pressed against the electrode 44. When the pressure on the work reaches a welding pressure, a suitable pressure switch 75 operates to close the circuit of a time relay 77. The time relay 77 receives its current from a transformer 78 which is connected across the lines 57 and 58 by means of parts of the lines 54 and 55. The pressure switch 75 is connected to the time relay 77 and the solenoid 88 of the contactor switch 87 by the lines 84 and 85. The pressure switch 75 initiates the flow of the welding current through the operation of the switch 87 and, also, the operation of the time relay 77 that controls the valve 62 through the solenoid 60 to which it is connected through parts of the line 54 and in parallel with the switch 53. The time relay 77 is connected to the parts of the line 54 by the lines 90. Consequently, the closing of the switch 53 causes the valve 62 to open and the time relay 77 holds it open for a pre-determined time although the switch 53 may be opened immediately after the pressure switch is closed. The flow of the welding current being controlled only by the pressure switch, the current flows to the electrodes only when the pressure of the electrodes on the work is above a pre-determined pressure and the closure of the valve 62, being controlled by the time relay, the pressure switch is opened in advance of the release of the electrodes which prevents arcing between the electrodes and the work. The primary 10 of the welder is connected to the secondary 92 of the transformer 91 by the lines 11 and 12. The primary 89 of the transformer 91 is connected to the main lines 57 and 58 by the contactor switch 87. The secondary 92 of the transformer 91 is provided with a plurality of contacts 93, any one of which may be connected, by means of the movable contact 94, with the primary 10 of the welder. The line 11 is connected to the movable contact 94 and the line 12 is connected to the terminal of the secondary 92 and, thus, a desired potential adjustment may be produced at the terminals of the primary 10 of the welder and the desired welding current may be produced in the circuit of the shell 7, the cylinder 2, and the piston 25 to cause the flow of a welding current having a desired amperage. In Fig. 7, the circuit of the shell and its electrode-supporting bracket, the cylinder and the piston, which forms the secondary of the welder transformer, is indicated by the heavy line A. At the expiration of an interval of time, as determined by the time relay, the valve 62 is opened to release the pressure and the pressure switch 75 is opened and the current ceases and the piston is returned by the spring 36, whereupon, the welder may be positioned for forming a succeeding weld.

The rolled core, shown in Figs. 3, 5, and 6, is preferably, provided with ends having cut corners, such as indicated at 97 and 98 in Fig. 6. One end of the rolled metal core is shown in Fig. 3 and the opposite end of the metal core is shown in Fig. 5. The edges 97 are shown curved, in the Figs. 3 and 5, by reason of the perspective presentation of the inclined edges. Also, the ends are spot-welded to the contiguous turns of the rolled core, as indicated at 99 in Fig. 3, and 100 in Fig. 5. The metal of the rolled core is then heat-treated to produce maximum efficiency in the welder transformer. To this end, the axial length of the core is much greater than the diameter to efficiently produce the transformation of the current, which is directed to the primary 10 from the secondary 92 of the auto-transformer 91. Preferably, the length of the core is greater than twice its wall thickness, and, for efficient welding operations, the core length is approximately twice the external diameter of the core. This affords an extended cylinder length within the primary 10 and enables a compact welder structure and a relatively long piston to produce a large contact area for the conduction of the secondary current through the wall of the cylinder. The grain of the metal of the core extends in the direction of the length of the strip that forms the wound core and, consequently, the primary is wound in a direction crosswise the grain, which enables the production of a large flux density, which, under the heavy load conditions to which the circuit is subjected, by reason of the low resistance of the secondary which is completed in advance of the completion of the primary circuit, or the induction of flow of the current in the primary circuit by the transformer 91, is exceedingly advantageous in welders. The primary 10 is connected to the adjustable secondary 93 of the transformer 91 having a primary 89, that is controlled by the pressure switch 75. The connection of the primary 10 with the adjustable secondary 93 produces controlled voltage and maximum load capacity, that is, the maximum current at the electrodes of the welder with a given voltage at the terminals of the primary 89 and a greatly increased capacity over that heretofore obtained in spot-welders that produce the same work.

I claim:

1. In a welder, a cylinder; a two-part piston, one of the parts free to axially slide in one direction in the cylinder; means for yieldably resisting the movement of the other of the parts in the other direction; and means for laterally pressing the parts against the cylinder when the pressure resisting the movement of the piston in the said other direction exceeds a pre-determined amount.

2. In a welder, a cylinder having an open end; a two-part piston, the parts having a common axis and operated by the cylinder pressure to move in an outward direction relative to said open end; and means for laterally pressing the parts against the cylinder when the outwardly moving cylinder pressure on the parts is resisted above a pre-determined point.

3. In a welder, a cylinder; a two-part piston, each of the parts having areas exposed to the cylinder pressure for axially moving the parts simultaneously; and means for producing opposite lateral pressure of the parts against the cylinder when the axial movement is resisted by a pre-determined pressure.

4. In a welder, a cylinder; a two-part piston with the parts disposed axially with respect to each other and the cylinder and having surfaces exposed to the cylinder pressure; means engaging one of the parts for yieldably resisting the movement of the parts by the cylinder pressure; and means for producing lateral pressure of the parts against the wall of the cylinder when resistance to axial movement reaches a pre-determined point.

5. In a welder, a cylinder; a two-part piston; an electrode connected to the piston, each of the parts of the piston having areas exposed to the cylinder pressure for axially moving the parts simultaneously; and means for producing opposite lateral pressure of the parts against the cylinder when the axial movement is resisted by the pressure of the electrode against the work.

6. In a welder, a source of welding current; a cylinder electrically connected to said source of welding current; a source of fluid pressure connected to said cylinder; a fluid pressure responsive piston disposed in said cylinder and having parts axially movable relative to each other; a welder electrode supported by and electrically connected to one of said piston parts, each piston part having a surface extending in a plane inclined to the central longitudinal axis of the cylinder and adapted to contact a like surface on another piston part and to coact therewith, when the welding electrode engages the work, to cause lateral movement of the piston parts in directions transverse the central longitudinal axis of the cylinder and pressure of said piston parts on the cylinder whereby welding current may be conducted from said source of welding current through said cylinder and piston parts to said welding electrode.

7. In a welder, a source of welding current; a cylinder electrically connected to the source of welding current; a plurality of intercontacting parts disposed in said cylinder, one of said parts being axially movable in said cylinder relative to other of said parts; a welding electrode supported by and electrically connected to said axially movable part, another of said parts supported for lateral movement relative to the cylinder; and means for causing lateral movement of said laterally movable part, when the welding electrode engages work, to press said laterally movable part against the cylinder and thereby to electrically connect the welding electrode with the source of welding current through said cylinder and parts.

WILLIAM H. MARTIN.